United States Patent
Laurent et al.

(10) Patent No.: US 6,740,854 B2
(45) Date of Patent: May 25, 2004

(54) DEVICE FOR SATELLITES INCLUDING POWER SUPPLY MEANS AND ASSOCIATED WITH HEATING MEANS

(75) Inventors: Frédéric Laurent, Cannes la Bocca (FR); Yves Folco, Peymeinade (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/365,459

(22) Filed: Feb. 13, 2003

(65) Prior Publication Data

US 2004/0050838 A1 Mar. 18, 2004

(30) Foreign Application Priority Data

Feb. 14, 2002 (FR) .............................................. 02 01846

(51) Int. Cl.$^7$ ................................................ H05B 1/02
(52) U.S. Cl. ....................... 219/490; 219/486; 219/485; 219/481; 307/41
(58) Field of Search ................................ 219/481, 494, 219/497, 501, 510–512, 490, 491, 492, 486, 483, 485; 307/39–41

(56) References Cited

U.S. PATENT DOCUMENTS

| | | | |
|---|---|---|---|
| 5,896,259 A | | 4/1999 | Farwell et al. |
| 6,157,008 A | * | 12/2000 | Brown et al. ............... 219/486 |
| 6,566,633 B2 | * | 5/2003 | Kitada ........................ 219/497 |

FOREIGN PATENT DOCUMENTS

| | | | |
|---|---|---|---|
| JP | 2003-15746 | * | 1/2003 |
| WO | WO 01/28293 A1 | | 4/2001 |

* cited by examiner

*Primary Examiner*—Mark Paschall
(74) *Attorney, Agent, or Firm*—Sughrue Mion, PLLC

(57) ABSTRACT

A device for satellites is associated with heaters that are turned on when the device is turned off and turned off when the device is turned on. The device includes a power supply, a system for turning the device on and off and a system for turning the heaters on and off controlled by the system for turning the device on and off. The power supply supplies power to the heaters when they are turned on and do not supply power to the heaters to turn on the device. The device is more particularly suited to communication equipment for satellites associated with substitution heaters.

5 Claims, 2 Drawing Sheets

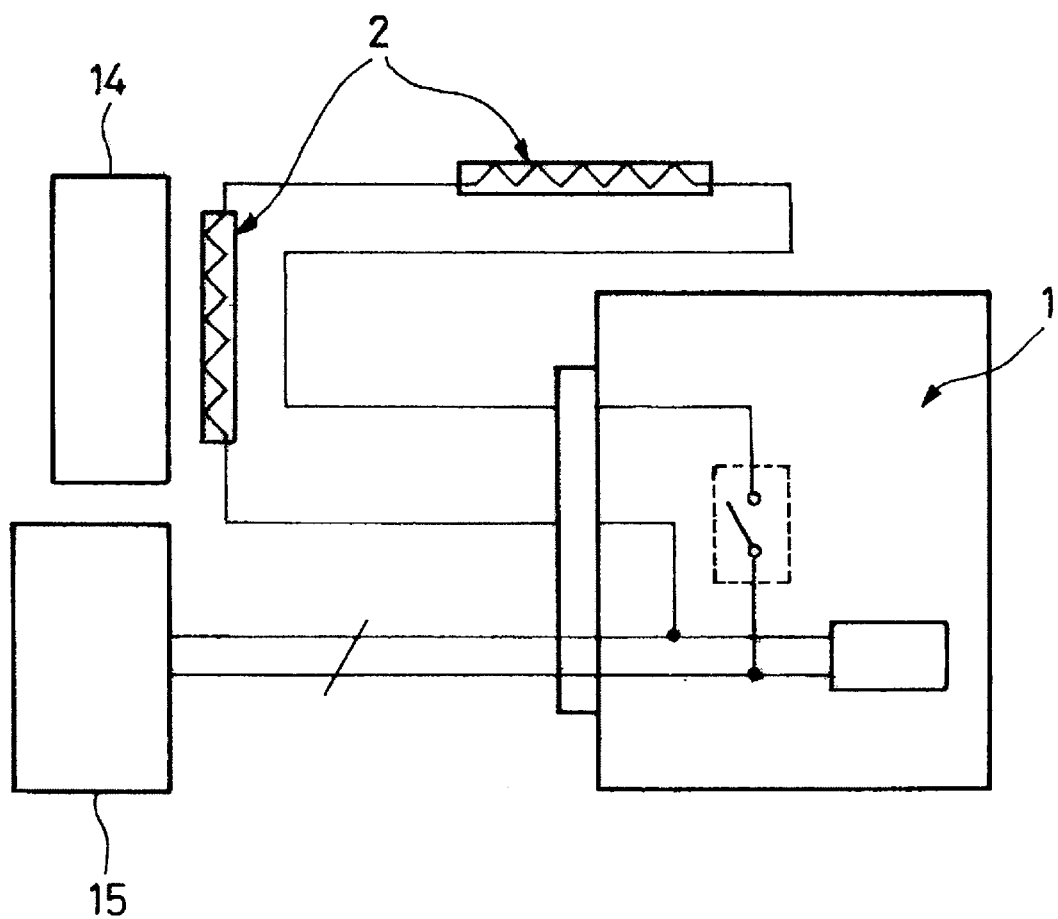
FIG_1

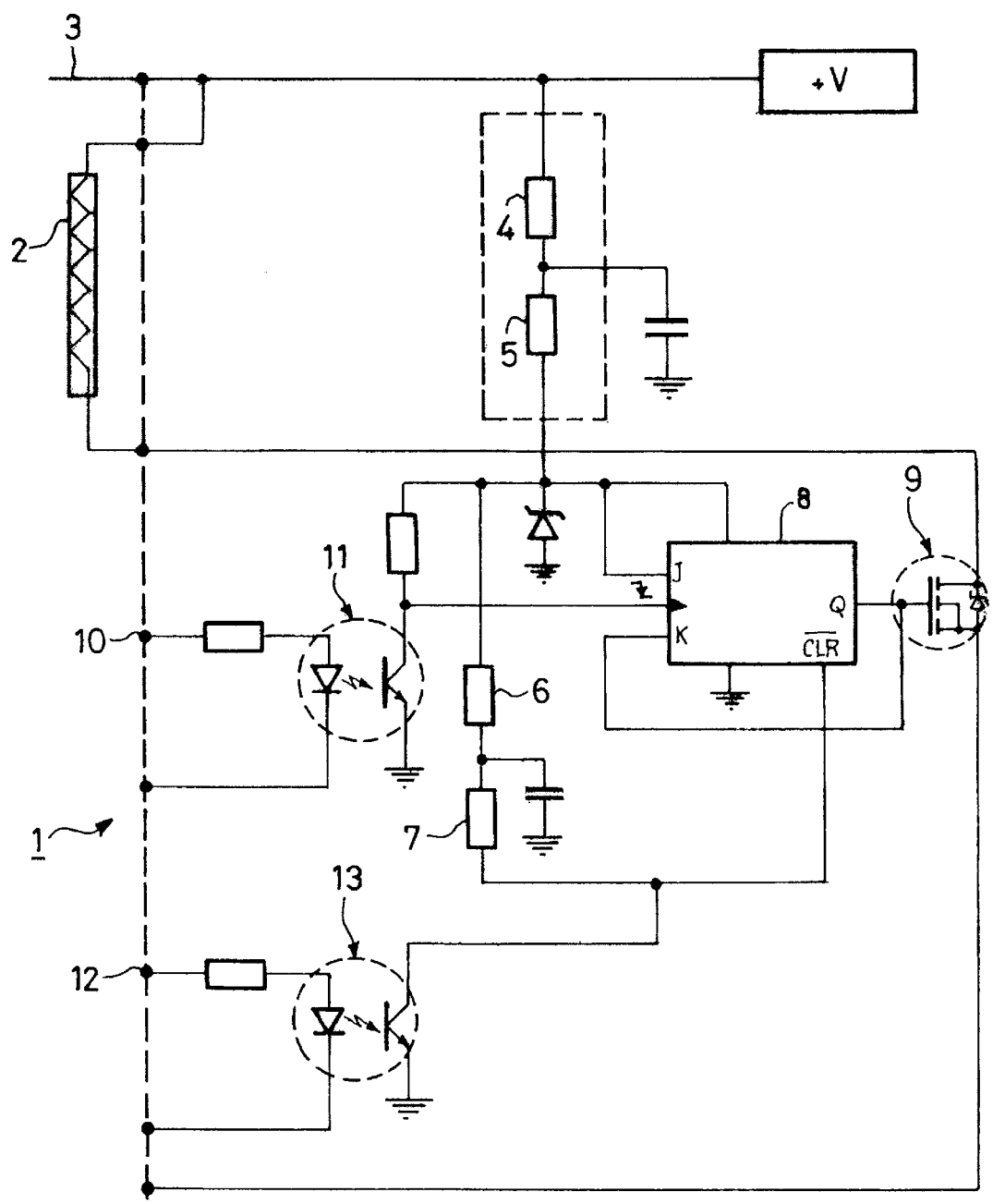
FIG_2

DEVICE FOR SATELLITES INCLUDING POWER SUPPLY MEANS AND ASSOCIATED WITH HEATING MEANS

CROSS-REFERENCE TO RELATED APPLICATIONS

This application is based on French Patent Application No. 02 01 846 filed Feb. 14, 2002, the disclosure of which is hereby incorporated by reference thereto in its entirety, and the priority of which is hereby claimed under 35 U.S.C. § 119.

BACKGROUND OF THE INVENTION

1. Field of the Invention

The present invention relates to a device for satellites including power supply means, means for turning the device on and off and associated with heating means, more particularly suited to communication equipment for satellites associated with substitution heaters.

2. Description of the Prior Art

As is known in the art, each equipment unit of a satellite dissipating heat is associated with a substitution heater which, in the flight configuration, is turned on when the equipment is turned off to maintain a thermal dissipation equivalent to that of the device. This applies in particular to electronic power conditioners (EPC) which supply power to microwave travelling wave tube amplifiers (TWTA) on board satellites for amplifying an RF signal before the latter is sent back to the Earth.

Each substitution heater associated with an EPC is supplied with electrical power by a dedicated equipment unit: electrical power is therefore distributed to the heater from the dedicated equipment unit, which is separate from the heater.

This separation leads to long cables between the heater and the dedicated equipment, adding to overall size and mass.

Furthermore, at present the means for turning the EPC and the heater on and off are decoupled; thus four turning on and turning off commands are required in total.

What is more, the number of heaters is not always equal to the number of EPC (to be more precise to the number of EPC-TWTA combinations). Thus manufacturers provide fewer heating lines than EPC. In this case, it is necessary to envisage the provision of redundant heaters to guard against failure of one of the heaters. Using fewer heaters than EPC implies the use of more powerful heaters.

A fault leading to simultaneous operation of an EPC and a heater is then not tolerable, the power emitted by the heater being too high.

The present invention aims to provide a device for satellites including power supply means and associated with heating means for circumventing the problem caused by the length of the cables between the heating means and the dedicated power distribution equipment, to take into consideration the close link between commands for the device and for the heating means, and to make simultaneous operation of the device and the heating means tolerable.

SUMMARY OF THE INVENTION

To this end the invention proposes a device for satellites, the device being associated with heating means adapted to be turned on when the device is turned off and to be turned off when the device is turned on, and the device including power supply means, means for turning the device on and off and means for turning the heating means on and off controlled by the means for turning the device on and off, so that the power supply means supply power to the heating means when they are turned on and do not supply power to the heating means to turn on the device. Thanks to the invention, the supply of power to the heating means directly from the device with which they are associated via its own power supply means avoids problems associated with long cables.

What is more, turning the heating means on and off via the means for turning the device on and off means that the means for turning heating means on and off can be connected to the means for turning the device on and off and thereby take into account the link that exists between the respective commands, which are in fact closely linked because, in the flight configuration, the heater is turned off when the EPC is turned on and conversely is turned on when the EPC is turned off.

Moreover, according to the invention, there is a correspondence between the number of devices and the number of heating means. This allows the use of less powerful heaters, because of which simultaneous operation of the heating means and the device is tolerable.

The means for turning the heating means on and off advantageously include a change of state device, for example a JK bistable. The use of this unit sequentially links turning the device on and off to turning the heating means on and off.

In one embodiment of the invention the means for turning the heating means on and off incorporate a power switch.

According to the invention, the inputs of the change of state device are controlled by the means for turning the device on and off and the output of the change of state device controls the power switch.

The present invention also provides a method of controlling the above device, which method includes the following steps:

turning off the device and the heating means when the power supply means are turned on, turning on the heating means and turning off the device on sending a first command to turn off the device, turning off the heating means and the device on sending a second command to turn off the device, and turning off the heating means and turning on the device on sending a command to turn on the device.

The above steps take account of the flight conditions (the heating means are turned on only when the device is turned off) and of the imperatives of ground testing, which require the heating means and the device to be turned off at the same time. They allow both automatic operation in flight and integration of test imperatives.

Other features and advantages of the present invention will become apparent in the course of the following description of one embodiment of the invention, which is provided by way of illustrative and nonlimiting example.

BRIEF DESCRIPTION OF THE DRAWINGS

FIG. 1 is a theoretical diagram of an EPC/TWTA combination associated with heaters and with a high-power distribution circuit.

FIG. 2 shows a control and power supply interface circuit of an EPC associated with a heater.

DETAILED DESCRIPTION OF THE PREFERRED EMBODIMENT

Common items are identified by the same reference numbers in both figures.

In FIG. 1, an EPC 1 and a TWTA amplifier 14 are each associated with a heater 2. The EPC 1 is supplied with power by a high-power distribution circuit 15 and itself generates a high-power supply to the TWTA 14.

In FIG. 2, only the portion of the EPC 1 constituting the control and power supply interface circuit conforming to the invention is shown. The other components of the EPC 1 are not shown. The EPC 1 is connected to a power bus 3 to generate the high-power supply for the TWTA.

When the satellite is powered up, the power bus 3 is supplied with power at a voltage +V. The voltage +V is the supply voltage at the clear terminal CLR of a JK bistable 8. The clear terminal CLR of the bistable being at a positive voltage, the output Q of the bistable goes to the low state, which turns off a power transistor 9. In this way, the heater 2 is not supplied with power. The EPC 1 is also turned off (initialization not shown).

The EPC 1 remains off on sending a first command to turn off the EPC 1 via the control input 10 of a photocoupler 11. The output Q of the bistable 8 goes to the high state and turns on the power transistor 9. The heater 2 is therefore supplied with power.

The EPC 1 remains off on sending a second command to turn off the EPC 1 via the control input 10 of the photocoupler 11. The output Q of the bistable 8 goes to the low state and turns off the power transistor 9. Thus the heater 2 is therefore no longer supplied with power.

The EPC 1 is turned on upon sending a command to turn on the EPC 1 via the control input 12 of a photocoupler 13. Moreover, the clear terminal CLR is again at a positive voltage and this causes the output Q of the bistable 8 to go to the low state: the transistor 9 is turned off and the heater is turned off.

Of course, the invention is not limited to the embodiment just described.

In particular, the embodiment relates to an EPC but the invention can be used for any other device for satellites supplying power and necessitating heating means. Thus the invention can be used in an EPC-TWTA combination associated with the same heating line or any other system supplying power and having common heating means.

Moreover, the JK bistable of the circuit can be replaced by some other change of state unit. Similarly, any power switch can be substituted for the power transistor used.

Finally, any means can be replaced by equivalent means without departing from the scope of the invention.

What is claimed is:

1. A device for satellites, said device being associated with heating means adapted to be turned on when said device is turned off and to be turned off when said device is turned on, and said device including power supply means, means for turning said device on and off and means for turning said heating means on and off controlled by said means for turning said device on and off, so that said power supply means supply power to said heating means when said device is turned off and do not supply power to said heating means when said device is turned on.

2. The device claimed in claim 1 wherein said means for turning said heating means on and off include a change of state device.

3. The device claimed in claim 1 wherein said means for turning said heating means on and off incorporate a power switch.

4. The device claimed in claim 2 wherein said change of state device has inputs controlled by said means for turning said device on and off and an output which controls said power switch.

5. A method of controlling a device as claimed in claim 1, which method includes the following steps:
   turning off said device and said heating means when said power supply means are turned on,
   turning on said heating means and turning off said device on sending a first command to turn off said device,
   turning off said heating means and said device on sending a second command to turn off said device, and
   turning off said heating means and turning on said device on sending a command to turn on said device.

* * * * *